United States Patent [19]

Garvey

[11] Patent Number: 4,979,279
[45] Date of Patent: Dec. 25, 1990

[54] FASTENER INSTALLATION TOOL APPARATUS

[75] Inventor: Michael C. Garvey, Bramalea, Canada

[73] Assignee: McDonnell Douglas Corporation, St. Louis, Mo.

[21] Appl. No.: 277,239

[22] Filed: Nov. 29, 1988

[51] Int. Cl.⁵ .............................................. B23P 19/04
[52] U.S. Cl. ...................................... 29/252; 72/391.2; 72/114
[58] Field of Search ............... 29/243.53, 252; 72/114, 72/391, 453.17

[56] References Cited

U.S. PATENT DOCUMENTS

| | | | |
|---|---|---|---|
| 2,088,859 | 8/1937 | Huck | 72/391 |
| 3,017,052 | 1/1962 | Kolec | 72/391 |
| 3,107,806 | 10/1963 | Van Hecke et al. | 72/391 |
| 3,302,510 | 2/1967 | Gapp | 72/391 |
| 3,722,329 | 3/1973 | Van Hecke et al. | 72/391 |

Primary Examiner—J. J. Hartman
Attorney, Agent, or Firm—Benjamin Hudson, Jr.; Timothy H. Courson; George W. Finch

[57] ABSTRACT

This invention provides a novel nose assembly for an installation tool for crimping or swaging nuts onto threaded bolts to form a lock-bolt combination. The nose assembly is configured such that its spindle has a bight section or slot to receive a projected head of a pull piston. This provides quick engagement and disengagement of the nose assembly from the installation tool that allows easier and faster change without the use of special tooling.

2 Claims, 2 Drawing Sheets

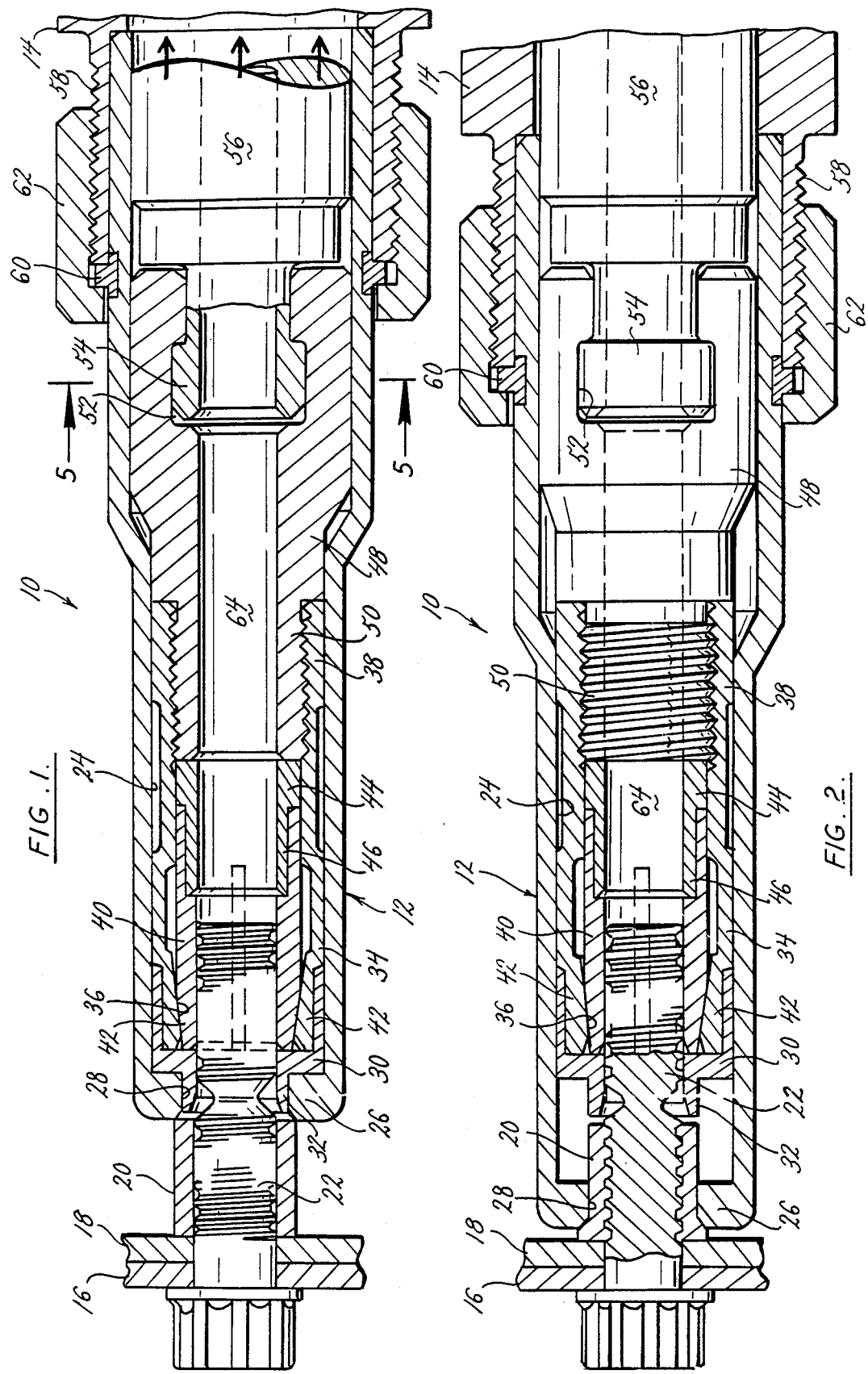

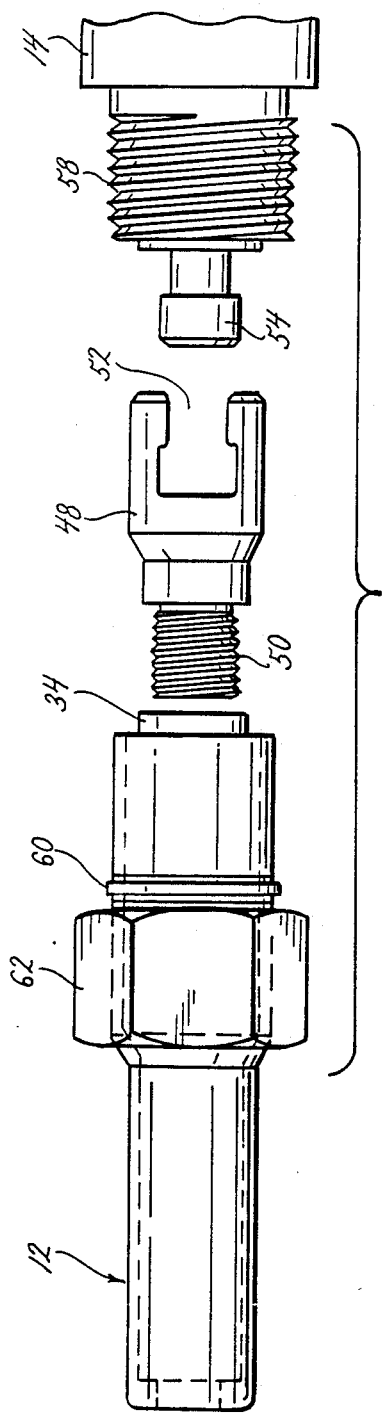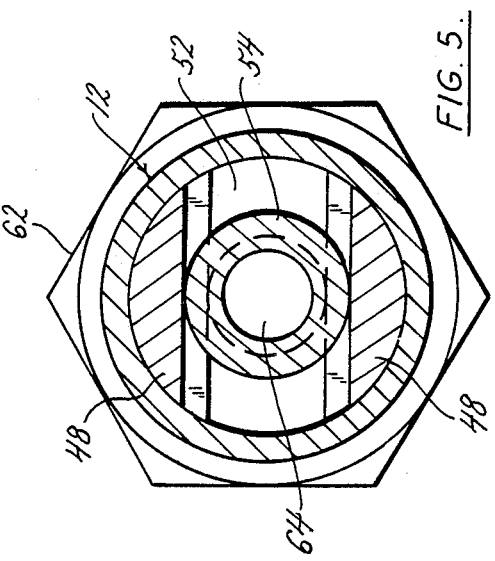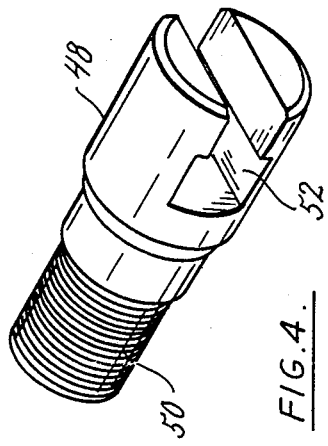

FASTENER INSTALLATION TOOL APPARATUS

BACKGROUND OF THE INVENTION

1. Field of the Invention

This invention relates generally to fastener installation tools for automatically crimping a nut onto a bolt forming a lock-bolt combination in a fastener assembly, and more particularly to apparatus generally referred to as a nose assembly for receiving the nut and bolt combination in a substantially tubular housing having means to secure and apply an axial force to the nut and bolt assembly for swaging the nut onto the bolt forming a fastener combination.

2. Description of the Prior Art

Conventionally, two or more workpieces may be secured together with a lock-bolt type combination, whereby a nut or collar is swaged onto a cylindrical pin or bolt by the crimping action of an axial force applied by an installation tool. The locking nut or collar is engaged by an apparatus generally referred to as a nose assembly which is part of a hydraulic or pneumatic pull-type installation tool well-known in the art. The effect of the crimping is to cause a portion of the counterbore of the nut to be forced into locking grooves on the bolt and to effect an elongation of the nut which places the bolt under high residual tension.

Conventional pull gun assemblies, commonly referred to as installation tools or guns are generally well known in the art, and may be modifications of the type described in U.S. Pat. No. 2,132,112 issued to L.C. Huck. Many modifications of the concept for the installation tool for swaging collars onto the threaded bolts have been proposed such as that shown in U.S. Pat. No. 3,329,000 issued to C.J. Schwab, et al and that is shown in U.S. Pat. No. 3,722,329 issued to Van Hecke, et al. These installation tools generally have what is commonly referred to as a nose assembly which houses an anvil member which performs the crimping function and also a means to grip the pin of the fastener. The pin or bolt is pulled by pull a piston in response to a hydraulic or pneumatic action such that the collar or nut is swaged by the anvil onto the bolt.

These nose assemblies must be changed to accommodate different bolt diameters and lengths for various lock-bolt applications. In assembly operations, such as aircraft construction, an operator may be required to install as many as 15 different types of lock-bolt combinations in an assembly process. This requires that the operator have 15 different installation available for each lock-bolt size or lose time in the assembly process while the nose assemblies are changed over for performing the different lock-bolt operations.

It would be desirable if there were provided an installation tool or gun that had means for providing a quick change of the nose assembly by the operator without the need for special tooling or lost time taking the tool out of service for changeover operations.

It is an object of this invention to provide an improved nose assembly which is actuated by the conventional pull type installation tool or gun with a feature that allows a operator to quickly change the nose assembly to accommodate different lock-bolt type specifications.

SUMMARY OF THE INVENTION

There is provided by this invention a unique nose assembly for pull type installation tools that facilitates quick change of the nose assembly without special tool requirements that allows an operator to make quick changes of the nose assembly on the job for different lock-bolt fastener applications without lost productivity. A slotted spindle configuration is provided within the nose assembly to receive the pull piston in a slip-fit type connection that allows rapid engagement and disengagement of the nose assembly from the pull piston.

BRIEF DESCRIPTION OF THE DRAWINGS

FIG. 1 is a sectional view of the nose assembly shown in relationship to a fastener to be set incorporating the principles of this invention;

FIG. 2 is a sectional view of the nose assembly shown in FIG. 1 in which the fastener has been partially set;

FIG. 3 is an exploded view of the nose assembly and pull piston illustrating the slip-fit type configurations;

FIG. 4 is an exploded view of the spindle illustrating the slot configuration for receiving the pull piston;

FIG. 5 is a sectional view of the spindle and piston along the lines 5—5 of FIG. 1.

BRIEF DESCRIPTION OF THE PREFERRED EMBODIMENT

Referring to FIG. 1 a partial sectional view of a pull gun assembly generally indicated by the reference numeral 10 comprise generally of a nose assembly 12 and a pull gun apparatus 14 not shown but well known in the art that is generally comprised of a hydrualically or pneumatically actuated piston assembly capable of applying an axial force in a manner hereinafter described. The pull gun 14, commonly referred to as an installation tool, functions to combine or attach two work pieces such as 16 and 18 by swaging a nut or collar 20 onto a pin or bolt 22. The nose assembly 12 is generally comprised of a tubular body having an axial bore 24. One end of the nose assembly 12 is generally comprised of an anvil portion 26 which may have a variety of shapes well known in the art to faciliate swaging. The anvil 26 has an opening 28 to receive the pin 22 of the lock-bolt combination. Disposed within the bore 24 at the forward of the nose assembly 12 is a generally tubular release ejector member 30. The ejector member 30 is slidable within the axial bore 24 of the nose assembly 12. The ejector assembly has a nose portion 32 which fits within the opening 28 of the anvil member 26 maintaining an axial bore for the pin 22. A generally tubular shaped collet assembly 34 is slidably engaged within the release ejector assembly 30 and has an axial bore 36 which is threaded at the rear portion 38. A tubular shaped chuck assembly 40 comprised of a plurality of individual chuck jaws in a manner well known in the art is mateable within the tapered bore 36 of the collet assembly 34. When the chuck assembly is mated within the tapered bore 36 of the collet 34, the collet 34 forces the individual chuck jaws 42 into engagement with the pin 22 securing it into position. The individual chuck jaws of the chuck assembly 40 maintain the axial bore through the nose assembly. A sleeve 44 is in engagement with the chuck assembly 40 having a forward portion 46 that extends within the axial bore of the chuck assembly 40. A spindle 48 having a threaded portion 50 screws within the threaded portion 38 of the collet assembly 34 until it engages the sleeve member 44. The end of the spindle 48 has a bight type opening or slot 52 configured to receive and mate with a projection 54 of the pull piston 56. Once the spindle is attached to the pull piston 56 of the installation tool or pull gun 14, the outer housing of the pull gun 14 is threaded at 58 and has an annular retainer 60 to receive a nut 62 that is placed over the nose assembly 12 and screws onto the threaded portion 58 of the pull gun housing 14 to secure the nose assembly to the pull gun. The pull piston 56 also is hollow with a central bore that is axially aligned with the bore in the spindle 48. In the assembled position the nose assembly and the pull gun has an axial center bore 64 that begins at the opening 28 and extends through the release ejector assembly 32, the collet assembly 34, the chuck jaw assembly 40, the sleeve 44, the spindle 48, and the pull piston 56 rearwardly through the remaining structure of the pull gun not shown.

To secure the work pieces 16 and 18 by the lock-bolt assembly 20 and 22, the nose assembly 12 is placed such that the pin is inserted into the opening 28 and bore 64 such that the pin extends through the bore 64, through the nose portion 32 of the release ejector 30, and into the individual jaw members of the chuck assembly 40. The pneumatic or hydraulic operation of the pull gun assembly 14 not shown but well known in the art, is such that the stroke of the pull piston is rearward as indicated by the arrows. With the opening 28 of the nose assembly 12 in close proximity to the collar 20, actuation of the pull piston creates a axial movement the collar assembly 34 relative to the collar 20 causing the chuck assembly 42 to engage, and secure the pin 22. An axial force is applied between the pull piston 26 and the nose assembly head 12. As the axial force increases with the stroke of the pull piston, the collar is forced into the opening 28 and the outer housing of the anvil 26 is forced over the collar 20, swaging the collar 20 into the locking grooves 66 of the pin 22.

As shown in FIG. 2, under the increase of the axial force causes the swaging of the collar 20 onto the pin 22 to be complete. Increasing the axial force further, causes the pin to sever and more axially rearwardly within the bore 64 through the (remaining) structure of the nose assembly through the pull gun exiting rearward in a manner not shown but well known in the art.

FIG. 3 illustrates an exploded view of the nose assembly 12 with the spindle 48 removed from the collet 34 and the projected head 54 of the pull piston 56 disengaged from the locking type slot 52 of the spindle 48. As can be seen, once the retaining nut 62 has been removed from the threaded portion 58 of the housing 14, the nose assembly 12 can be quickly disengaged from the pull piston 56 by simply sliding the projected head 54 out of the notch or slotted portion 52 of the spindle 48. FIG. 4 illustrates the slotted or bight portion of the spindle assembly 48 in an exploded view. This design facilitates the quick change capability of various nose assemblies for different size fasteners that must be installed by pull gun apparatus 14.

FIG. 5—5 is a sectional view taken along the lines 55 of FIG. 1 illustrating the pull piston attached to the spindle 48. Therefore, the bight portion or slotted portion 52 of the spindle 48 serves to lock the pull piston 56 to the spindle of the nose assembly 12 but, at the same time provides a quick release mechanism for disengaging the nose assembly when changeover is required.

Although there has been illustrated and described in specific detail and a structure of operation, it is clearly understood that the same were merely for the purposes of illustration and that changes and modifications may be readily made therein by those skilled in the art without departing from the spirit and the scope of this invention.

I claim:

1. Apparatus for applying a fastener which includes a threaded bolt and collar combination adapted such that the collar may be swaged into threaded locking grooves of the bolt, said apparatus comprising:
   a substantially hollow anvil member having an aperture therein for receiving a shank portion of a bolt and collar combination;
   a substantially hollow gripping means disposed within the hollow anvil member for engaging the shanked portion of the bolt and collar combination such that collar is secured in close proximity to an opening of the hollow anvil member;
   a substantially hollow spindle means for securing the gripping means having a bight portion at the end thereof;
   a substantially hollow piston means having a projected head for engagement with the bight portion of the spindle means wherein the piston means is connected to a hydraulic or pneumatic force for applying an axial force and axial movement to the piston means, the spindle means, and the gripping means, relative to the anvil member such that the bolt and collar combination is pulled axially forcing the collar into the anvil member to cause a swaging of the collar onto the locking grooves of the bolt; and
   wherein the substantially hollow anvil member, gripping means, spindle means, and piston means define a center bore of the apparatus wherein the axial force applied to the bolt causes it to sever and the center bore provides a passage for the severed portion of the bolt.

2. Apparatus for applying a fastener which includes a threaded bolt and collar combination adapted such that the collar may be swaged into the locking grooves of the bolt as recited in claim 1 wherein said gripping means comprises a plurality of individual chuck jaw members movable axially within a tapered bore section of the anvil member such that upon axial movement within the tapered bore section of the anvil member the tapered bore causes the chuck jaw members to close to secure the bolt.

* * * * *